United States Patent [19]
Aruga et al.

[11] 4,324,098
[45] Apr. 13, 1982

[54] HYDRAULIC CIRCUIT FOR A HYDRAULICALLY DRIVEN VEHICLE

[75] Inventors: Taketo Aruga; Koichi Morita, both of Isehara; Kenzo Hoashi; Yasuo Kojima, both of Yokohama, all of Japan

[73] Assignee: Kabushiki Kaisha Komatsu Seisakusho, Tokyo, Japan

[21] Appl. No.: 122,273

[22] Filed: Feb. 19, 1980

[30] Foreign Application Priority Data

Nov. 18, 1977 [JP] Japan .................................. 52-137870

[51] Int. Cl.³ ...................... B62D 11/04; F16H 39/46
[52] U.S. Cl. ........................................ 60/420; 60/456; 60/464; 180/6.48
[58] Field of Search ................. 60/464, 468, 484, 486, 60/488, 490, 420, 428, 456; 180/6.48; 91/530, 531, 466

[56] References Cited

U.S. PATENT DOCUMENTS

| | | | |
|---|---|---|---|
| 3,247,919 | 4/1966 | Moon, Jr. | 180/6.48 |
| 3,659,419 | 5/1972 | Ikeda | 60/484 X |
| 3,896,617 | 7/1975 | Kraina | 60/486 X |
| 3,982,469 | 9/1976 | Bianchetta | 60/484 X |
| 4,023,363 | 5/1977 | Liebert | 60/468 X |
| 4,024,796 | 5/1977 | Thedbald | 91/531 X |

Primary Examiner—Irwin C. Cohen
Attorney, Agent, or Firm—Armstrong, Nikaido, Marmelstein & Kubovcik

[57] ABSTRACT

A hydraulic circuit for a hydraulically driven vehicle comprising a pair of variable displacement pumps each driven by a common engine, a pair of variable displacement motors each connected with the respective variable displacement pumps in a closed loop circuit and driven thereby, a fixed displacement charge pump driven by the engine, and a pair of shuttle valves each connected in parallel with the respective closed loop circuits and has formed therein a neutral position and two offset positions wherein in the neutral positions of the shuttle valves both the closed loop circuits are connected with each other through the shuttle valves.

2 Claims, 1 Drawing Figure

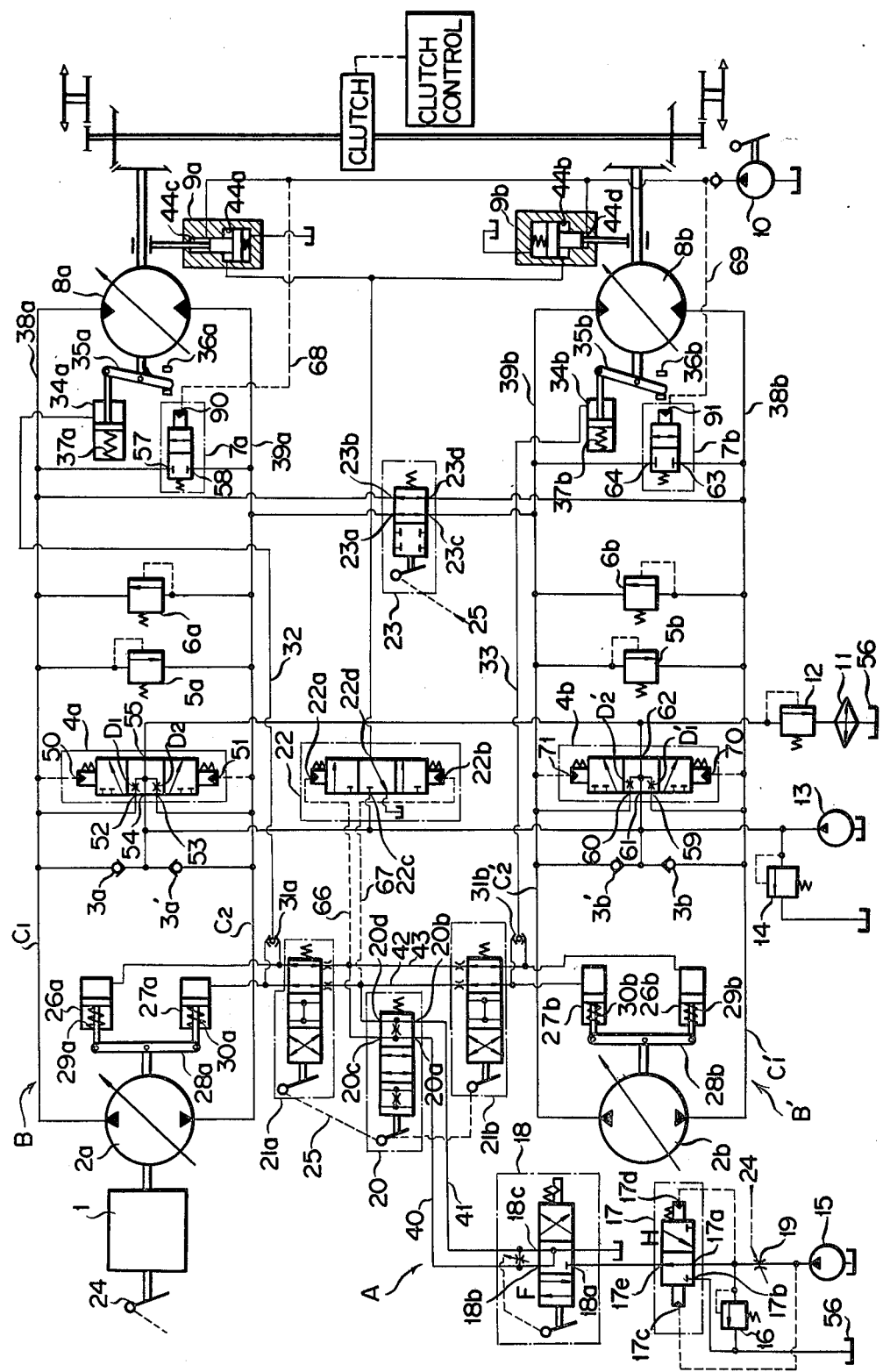

HYDRAULIC CIRCUIT FOR A HYDRAULICALLY DRIVEN VEHICLE

BACKGROUND OF THE INVENTION

This invention relates to a hydraulic circuit for a hydraulically driven vehicle and in particular to shuttle valves arrangements in the circuit.

A hydraulically driven vehicle is generally provided with a pair of variable displacement pumps driven by a common engine and a pair of variable displacement motors each connected with the respective variable displacement pumps in a closed loop circuit and driven thereby. Each the closed loop circuit has connected in parallel therewith a shuttle valve.

Both the shuttle valves are connected with each other and with a fixed displacement charge pump driven by the common engine. However, since the neutral position of such a conventional shuttle valve is not connected with the respective closed loop circuits, no connection is established between the both closed loop circuits when the both shuttle valves remain in their neutral positions. Therefore even when the vehicle is being stopped or parked with its engine running, there is a possibility for the vehicle to start creeping because the exact balance of both the closed loop circuits may not sometimes be obtained in the case that the complete zero of the displacement of both the variable displacement pumps are not established.

SUMMARY OF THE INVENTION

It is therefore an object of the present invention to provide a hydraulic circuit for a hydraulically driven vehicle which is capable of preventing the creeping of the vehicle when it is stopped or parked with its engine running.

Another object of the present invention is to provide a hydraulic circuit for a hydraulically driven vehicle wherein the pressure equilibrium in both closed loop circuits for driving the vehicle can be obtained through the use of shuttle valves when the vehicle is stopped or parked with its engine running thereby preventing the creeping of the vehicle.

In accordance with an aspect of the present invention, there is provided a hydraulic circuit for a hydraulically driven vehicle, comprising a pair of variable displacement pumps each driven by a common engine, a pair of variable displacement motors each connected with said respective variable displacement pumps in a closed loop circuit and driven thereby, means for controlling the displacement volume of said variable displacement pumps, means for controlling the displacement volume of said variable displacement motors, and a fixed displacement charge pump driven by said engine.

Connected in parallel with each of the closed loop circuit is a shuttle valve means which has formed therein a neutral position and two offset positions. When both the shuttle valve means remain in their neutral positions, both the closed loop circuits are connected with each other through the shuttle valve means and with the charge pump. Therefore, hydraulic fluid pressures in both the closed loop circuits are equalized when the vehicle is brought to a stop with its engine still running.

By bypassing the closed loop circuit through the shuttle valve when the vehicle is stopped or parked with its engine running, an accidental creeping of the vehicle can be completely prevented.

The above and other objects, features and advantages of the present invention will be readily apparent from the following description taken in conjunction with the accompanying drawings.

BRIEF DESCRIPTION OF THE DRAWING

The accompanying drawing is an overall hydraulic circuit for a hydraulically driven vehicle employing shuttle valves arrangements according to the present invention.

DETAILED DESCRIPTION OF THE INVENTION

The present invention will now be described in detail below by way of example only with reference to the accompanying drawing.

Reference numerals $2a$ and $2b$ denote variable displacement pumps adapted to be driven by an engine 1, 15 a control pump adapted to be driven by the engine 1, and 13 a charge pump adapted to be driven by the engine 1.

The variable displacement pump $2a$ is connected to a variable displacement motor $8a$ through conduits $38a$ and $39a$ which constitute main circuits $C_1$ and $C_2$ thereby forming a hydraulic closed loop circuit B for hydraulic drive. Reference numeral $4a$ denote a shuttle valve which has changeover ports 50 and 51 connected to the conduits $38a$ and $39a$, respectively. The shuttle valve $4a$ has also ports 52 and 53 connected to the conduits $38a$ and $39a$ and a port 54 connected to the delivery side of the charge pump 13.

Further, the port 54 is connected through check valves $3a$ and $3a'$ to the conduits $38a$ and $39a$, respectively. The shuttle valve $4a$ has also a port 55 which leads to a tank 56 through a relief valve 12 and a cooler 11. The aforementioned conduits $38a$ and $39a$ are interconnected through relief valves $5a$ and $6a$.

Further, the ports 52, 53 and 54 of the neutral circuit of the shuttle valve $4a$ are interconnected, the ports 52 and 53 having orifices $D_1$ and $D_2$ built therein, respectively. Reference numeral $7a$ denotes a bypass valve which has ports 57 and 58 connected to the conduits $38a$ and $39a$, respectively.

The variable displacement pump $2b$ is connected to a variable displacement motor $8b$ through conduits $38b$ and $39b$ which constitute main circuits $C_1'$ and $C_2'$ thereby forming a closed loop circuit $B'$ for hydraulic drive. Reference numeral $4b$ indicates a shuttle valve which has changeover ports 70 and 71 connected to the conduits $38b$ and $39b$, respectively.

The shuttle valve $4b$ has also ports 59 and 60 connected to the conduits $38b$ and $39b$, respectively, and a port 61 connected to the delivery side of the charge pump 13.

Further, the port 61 is connected through check valves $3b$ and $3b'$ to the conduits $38b$ and $39b$, respectively. The shuttle valve $4b$ has also a port 62 which leads to the tank 56 through the relief valve 12 and the cooler 11. The aforementioned conduits $38b$ and $39b$ are interconnected through relief valves $5b$ and $6b$.

Further, the ports 59, 60 and 61 of the neutral circuit of the shuttle valve $4b$ are interconnected, the ports 59 and 60 having orifices $D_1'$ and $D_2'$ built therein, respectively.

Reference numeral 7b indicates a bypass valve having ports 63 and 64 connected to the conduits 38b and 39b, respectively.

Reference numeral 23 denotes a straight run compensator valve having ports 23a, 23b, 23c and 23d connected to the conduits 39a, 38a, 39b and 38b, respectively.

Reference character "A" denotes a control circuit which comprises an automatic control valve or speed change valve 17, a forward and backward and speed control valve or P O C valve 18, a steering interference compensator valve 20, steering valves 21a and 21b, and a parking brake release valve 22.

The above-mentioned automatic control valve 17 has a port 17a connected through an adjustable orifice 19 to the delivery side of the control pump 15, a port 17b leading to the tank 56, and changeover ports 17c and 17d connected to the delivery side of the control pump 15 and on the upstream and downstream sides of the adjustable orifice 19. Reference numeral 16 denotes a control relief valve.

The adjustable orifice 19 is interlocked with a throttle lever 24.

The automatic control valve 17 has also a port 17e connected to port 18a of P O C valve 18. The P O C valve 18 has ports 18b and 18c which are connected through conduits 40 and 41 to ports 20a and 20b, respectively of the steering interference compensator valve 20.

The steering interference compensator valve 20 has ports 20c and 20d which are connected at one hand through a steering valve 21a to hydraulic cylinders 26a and 27a, respectively, for controlling the variable displacement pump 2a and which are connected at the other hand through a steering valve 21b to hydraulic cylinders 26b and 27b, respectively, for controlling the variable displacement pump 2b. Further, ports 20c and 20d of the steering interference compensator valve 20 are connected to two ports of a shuttle valve 31a, another port of which is connected through a conduit 32 to a hydraulic cylinder 34a for controlling the variable displacement motor 8a.

In the similar manner, the ports 20c and 20d are connected to two ports of the shuttle valve 31b, another port of which is connected through a conduit 33 to a hydraulic cylinder 34b for controlling the variable displacement motor 8b. Further, the ports 20c and 20d are connected through pilot conduits 66 and 67 to changeover ports 22a and 22b of the parking brake release valve 22.

The parking brake release valve 22 has also a port 22c connected to the delivery side of the charge pump 13 and a port 22d connected to chambers 44a and 44b of automatic parking brakes 9a and 9b.

The automatic parking brakes 9a and 9b have rod side chambers 44c and 44d, respectively, which are connected to the delivery side of a manually operated pump 10. The delivery side of the manually operated pump 10 is connected through pilot conduits 68 and 69 to changeover ports 90 and 91 of the bypass valves 7a and 7b, respectively. The control cylinders 34a and 34b have rods connected through links 35a and 35b to the control units of the variable displacement motors 8a and 8b. The movable ranges of the links 35a and 35b are restricted by stoppers 36a and 36b, respectively.

Further, the control unit of the aforementioned variable displacement pump 2a is connected through a link 28a to the rods of the control cylinders 26a and 27a.

Whilst, the control unit of the variable displacement pump 2b is connected through a link 28b to the rods of the control cylinders 26b and 27b. Further, the lever of the steering interference compensator valve 20 is connected through a steering linkage 25 to levers of the steering valves 21a and 21b and the straight run compensator valve 23, respectively. Further, the output shafts of the variable displacement motors 8a and 8b are connected mechanically through a clutch which is controlled by a clutch control unit. When the steering valve is manipulated, the clutch is disengaged and the output shafts of the motors 8a and 8b are disconnected.

The operation of the control device of the present invention will now be described below.

(1) When the vehicle is stopped with its engine running, the lever of P O C valve 18 is held at neutral position so that the port 18a is blocked and the other ports 18b and 18c are connected to the drain. Therefore, the fluid delivered by the control pump 15 is drained through the relief valve 16. Because the output pressure of P O C valve 18 is kept at drain pressure, the pump and motor control pressures are kept at the drain pressure, and as a result, the angles of swash plates of the variable displacement pumps 2a and 2b are 0 degree. Therefore, the delivery volume of the fluid will be zero. At that time, the automatic parking brake release valve 22 is inoperative, and so the parking brakes 9a and 9b remain engaged. At that time, even if the hydraulic pressure of one of the two closed loop circuits B and B' is going to become higher than the other in the case that the complete zero of the displacement of the pump is not established, their circuit pressures will be kept equal approximately, because the circuits B and B' are connected through the shuttle valves 4a and 4b which are kept at their neutral positions. For this reason, the creeping of the vehicle caused by an increase in pressure in one of the closed loop circuits beyond the other can be prevented. It is necessary to provide the shuttle valves 4a and 4b with the orifices $D_1$, $D_2$, $D_1'$ and $D_2'$ so that they can perform the same operation as those of the prior art shuttle valves when the delivery volume of the variable displacement pump exceeds a predetermined amount. In other words, the provision of the orifices $D_1$, $D_2$, $D_1'$ and $D_2'$ is required to generate a differential pressure necessary for actuating the shuttle valves.

(2) In the case it is desired to drive the vehicle straightly, if the throttle lever 24 is set at any desired position, the adjustable orifices 19 interlocked with the lever 24 will be set. (The details of the operation will be mentioned later).

When the P O C valve 18 is set at any desired position, its output pressure will be kept at a figure proportional to the displacement of the lever thereof. Therefore, the angle of the swash plates of the pump and motor can be controlled by the output pressure.

At that time, the automatic parking brakes 9a and 9b are released or rendered inoperative by the action of the brake release valve 22.

If the lever of P O C valve 18 is set at a position "F" of full stroke, conduit 40 will be kept at a maximum control pressure, whilst conduit 41 will be kept at a drain pressure. Therefore, conduit 43 will be kept at a maximum control pressure, and conduit 42 will be kept at a drain pressure. At that time, the pump controlling cylinders 26a and 26b are kept at a maximum control pressure by way of a conduit 43 so that the swash plates of the pumps 2a and 2b can be kept at an angle (maximum inclination angle) balancing the forces of springs 29a and 29b.

Whilst, the fluid under pressure within the conduit 43 is introduced through the shuttle valves 31a and 31b and the conduits 32 and 33 into the motor controlling cylinders 34a and 34b so that the swash plates of the motors, 8a and 8b can be kept an an angle (minimum inclination angle) balancing the forces of springs 37a and 37b. As a result, the running speed of the vehicle will reach its maximum.

At that time, because the pilot pressure 22a of the automatic parking brake release valve 22 is kept at a maximum control pressure and the pilot pressure 22b is kept at the drain pressure to enable change-over to be made, the fluid under pressure delivered by the charge pump 13 will be introduced into the chambers 44a and 44b of the automatic parking brakes 9a and 9b so as to overcome the resilient forces of the springs thereby releasing the brakes.

At that time, the steering valves 21a and 21b, the steering interference compensator valve 20 and the straight run compensator valve 23 are inoperative and kept under the same condition as shown in the attached drawing.

Consequently, the high and low pressure sides of the two closed loop circuits B and B' are interconnected through the neutral position of the straight run compensator valve 23 and both circuits B and B' will be equalized.

Further, the output shafts of the motors are connected mechanically because the clutch is engaged. Therefore, the speed of each motor is equal. Because the volume of the fluid under pressure delivered by the control pump 15 is directly proportional to the engine speed, if the engine speed is reduced by any external disturbance, for example, when the load on the engine is increased, the delivery volume will be reduced. Accordingly, if the adjustable orifice 19 is set at an any desired position and the engine speed is further reduced, the differential pressure between the upstream and downstream sides of the adjustable orifice 19 is reduced so that the automatic control valve 17 can be changed over to a position H and the pump and motor control pressures will be drained to reduce the angle of swash plates of the pumps thereby enabling automatic control or speed change to be achieved.

Because the adjustable orifice 19 is interlocked with the throttle lever 24, a high efficiency can be obtained even if the engine is set at low speed.

When the lever of P O C valve 18 is set at any position between the neutral and full stroke positions, the pump and motor will be kept at a control pressure proportional to the amount of movement of the lever so that the swash plates of the pump and motor can be kept at suitable angles corresponding to the amount of movement of the lever thereby enabling the speed of the vehicle to be controlled as desired. The automatic control when the engine speed is reduced is as mentioned herein before.

(3) When it is desired to turn the vehicle, the lever of either of the steering valves 21a and 21b is operated. For example, if the lever of the steering valve 21a is manipulated, the control pressure of the high pressure side of the variable displacement pump 2a will be reduced and the control pressure which equals to the drain pressure will increase. If the lever is manipulated further, the two control pressures will become equal so that the angle of the swash plates will become zero.

If the lever is manually moved further, the hydraulic cylinder 26a which has been subjected to a high control pressure will be subjected to a low control pressure, whilst the hydraulic cylinder 27a which has been kept at a low control pressure will be subjected to a high control pressure. As a result, the variable displacement pump 2a will commence its reverse rotation. Whilst, the variable displacement motor will always be kept on the high pressure side of the control pressures of the variable displacement pump through the shuttle valve 31a.

Because the lever of the steering interference compensator valve 20 is interlocked with the steering lever when either one of the steering valves is manipulated, the equivalent orifice of the control circuit can always be kept constant. Therefore, even if one of the steering valves is manipulated, the control pressure of the other steering valve will remain unchanged so that a constant delivery volume of the fluid under pressure can be kept.

Further, if one of the steering valves is manipulated, the two closed loop circuits B and B' will be disconnected, because the steering valve is interlocked with the lever of the straight run compensator valve 23.

Further, the output shafts of the motors are disconnected because the clutch is disengaged by the clutch control unit.

(4) When it is desired to stop the engine of a vehicle and tow it by another vehicle, it is only necessary to operate the manually operated pump 10 so as to release the automatic parking brake and change over the bypass valves 7a and 7b thereby enabling a bypass circuit to be formed and towing or traction to be achieved.

While the present invention has been described in terms of a preferred embodiment, the claims appended hereto are intended to encompass other embodiments which fall within the spirit of the invention.

What we claim is:

1. In a hydraulic circuit for a hydraulically driven vehicle including a pair of variable displacement hydraulic pumps, each driven by a common engine, a pair of variable displacement hydraulic motors, each connected with said respective variable displacement pumps in a closed loop circuit and driven thereby, means for controlling the displacement of volume of said variable displacement pumps and means for controlling the displacement of said variable displacement motors, the improvement comprising:

a fixed displacement charge pump driven by said engine;

a passage means leading to tank via a relief valve means; and a pair of pilot-operated shuttle valve means, each connected in parallel with said respective closed loop circuits and each operated by fluid pressure therein, each said shuttle valve means having a neutral position and two offset positions formed therein wherein, in each of said offset positions of said shuttle valve means a lower pressure side of a respective closed loop circuit is in open communication with said passage means and in the neutral positions of said shuttle valve means, both sides of each closed loop are connected together and both said closed loop circuits are connected with each other through said passage means and said shuttle valve means and with said charge pump, thereby equalizing the hydraulic fluid pressure in both said closed loop circuits.

2. A hydraulic circuit for a hydraulically driven vehicle as recited in claim 1 wherein the neutral position of each of said shuttle valve means has formed therein restricted orifice means through which both sides of each said closed loop circuit are interconnected and are connected to the other of said closed loop circuits.

* * * * *